(12) United States Patent
Kono et al.

(10) Patent No.: US 11,518,838 B2
(45) Date of Patent: Dec. 6, 2022

(54) MODIFIED POLYOLEFIN RESIN COMPOSITION AND METHOD FOR PRODUCING THE SAME

(71) Applicant: NIPPON PAPER INDUSTRIES CO., LTD., Kita-ku (JP)

(72) Inventors: Masaru Kono, Tokyo (JP); Takao Yoshimoto, Tokyo (JP); Takato Takenaka, Tokyo (JP); Minoru Yada, Tokyo (JP); Naosuke Komoto, Tokyo (JP)

(73) Assignee: NIPPON PAPER INDUSTRIES CO., LTD., Kita-ku (JP)

( * ) Notice: Subject to any disclaimer, the term of this patent is extended or adjusted under 35 U.S.C. 154(b) by 335 days.

(21) Appl. No.: 16/644,818

(22) PCT Filed: Oct. 23, 2018

(86) PCT No.: PCT/JP2018/039389
§ 371 (c)(1),
(2) Date: Mar. 5, 2020

(87) PCT Pub. No.: WO2019/082903
PCT Pub. Date: May 2, 2019

(65) Prior Publication Data
US 2021/0070911 A1    Mar. 11, 2021

(30) Foreign Application Priority Data

Oct. 25, 2017    (JP) .............................. JP2017-205999

(51) Int. Cl.
| | |
|---|---|
| *C08F 290/12* | (2006.01) |
| *C09D 5/00* | (2006.01) |
| *C09D 11/106* | (2014.01) |
| *C09D 133/16* | (2006.01) |

(52) U.S. Cl.
CPC .......... *C08F 290/122* (2013.01); *C09D 5/002* (2013.01); *C09D 11/106* (2013.01); *C09D 133/16* (2013.01)

(58) Field of Classification Search
CPC . C08F 290/122; C09D 133/16; C09D 11/106; C09D 5/002
USPC ....................................................... 524/825
See application file for complete search history.

(56) References Cited

U.S. PATENT DOCUMENTS

| | | | | |
|---|---|---|---|---|
| 4,997,882 A | * | 3/1991 | Martz ................... | C08J 7/0427 525/65 |
| 5,811,489 A | * | 9/1998 | Shirai ................... | C09D 151/04 525/74 |
| 2004/0147684 A1 | | 7/2004 | Masuda et al. | |
| 2006/0074181 A1 | | 4/2006 | Eagan et al. | |
| 2011/0190182 A1 | | 8/2011 | Price et al. | |
| 2012/0245297 A1 | | 9/2012 | Nakajima et al. | |

FOREIGN PATENT DOCUMENTS

| | | |
|---|---|---|
| CN | 102124062 A | 7/2011 |
| DE | 195 81 064 T1 | 10/1996 |
| JP | 62-121747 A | 6/1987 |
| JP | 4-23839 A | 1/1992 |
| JP | 4-53805 A | 2/1992 |
| JP | 4-288336 A | 10/1992 |
| JP | 8-12913 A | 1/1996 |
| JP | 8-59757 A | 3/1996 |
| JP | 3059766 B2 | 7/2000 |
| JP | 3059766 B2 * | 7/2000 |
| JP | 3318925 B2 | 8/2002 |
| JP | 3318925 B2 * | 8/2002 |
| JP | 2004-331821 A | 11/2004 |
| JP | 2004-339354 A | 12/2004 |
| JP | 2012-201792 A | 10/2012 |
| JP | 2015-157963 A | 9/2015 |
| JP | 6025320 B2 | 11/2016 |
| WO | WO 96/04344 A1 | 2/1996 |
| WO | WO 2013/080629 A1 | 6/2013 |
| WO | WO 2018/155309 A1 | 8/2018 |

OTHER PUBLICATIONS

Internaitonal Search Report dated Jan. 29, 2019 in PCT/JP2018/039389 filed Oct. 23, 2018, citing documents AA-AC and AN-AV therein, 2 pages.

Extended European Search Report dated Jun. 14, 2021 in European Patent Application No. 18869511.8, citing documents AA and AB therein, 8 pages.

Notification of Reason for Refusal dated May 17, 2021 in Korean Patent Application No. 10-2020-7012074 (with English machine translation), citing document AO therein, 17 pages.

Office Action dated Nov. 26, 2021 in corresponding Korean Patent Application No. 10-2020-7012074 (with English Translation), citing documents AO and AP therein, 4 pages.

(Continued)

*Primary Examiner* — Hui H Chin

(74) *Attorney, Agent, or Firm* — Oblon, McClelland, Maier & Neustadt, L.L.P.

(57) ABSTRACT

An object is to provide a resin composition having excellent performance as a binder such as adhesiveness and, at the same time, retaining solution properties favorably even after a solution is stored for a long period of time. A modified polyolefin resin composition includes a modified polyolefin resin (C), in which the modified polyolefin resin (C) is a resin made by modifying a polymer (A) that is a polymer (a) of a polyolefin resin or a chlorinated polyolefin resin and an α,β-unsaturated carboxylic acid derivative having a structure derived from at least one carboxy group or a chlorinated product (b) thereof with a modification component including an alcohol (B); and a residual ratio of the structure derived from at least one carboxy group in the modified polyolefin resin (C) is 50% or more and 80% or less.

11 Claims, No Drawings

(56) References Cited

OTHER PUBLICATIONS

Combined Chinese Office Action and Search Report dated Feb. 11, 2022 in Chinese Patent Application No. 201880069714.4 (with unedited computer generated English translation), citing documents AO through AS and AX therein, 17 pages.

"Coatings Technology", Coating Technology Training Class under the former Ministry of Fuel and Chemical Industries. Chemical Industry Press, Jan. 31, 1980, p. 184 with cover page (with English translation).

Office Action dated Sep. 30, 2022, in Chinese Patent Application No. 201880069714 w/English translation.

L. Zengtian, Coatings For Plastics and Coating Thereof, Beijing: Scientific and Technical Documentation Press, Mar. 2006 w/English translation.

* cited by examiner

MODIFIED POLYOLEFIN RESIN COMPOSITION AND METHOD FOR PRODUCING THE SAME

FIELD

The present invention relates to a modified polyolefin resin composition and a method for producing the same.

BACKGROUND

Polyolefin resins are employed as substrates for various applications because the resins are inexpensive and have excellent formability. However, the polyolefin resins have low polarity and high crystallinity and thus painting, adhesion, and the like are difficult. In order to improve adhesion of paints to the polyolefin resins, use of modified chlorinated polyolefin resins obtained by modification treatment such as chlorination, acid modification with unsaturated carboxylic acids, and modification with (meth)acrylic acid ester as a binder to the polyolefin resins has been developed (Patent Literature 1).

CITATION LIST

Patent Literature

Patent Literature 1: Japanese Patent No. 3,318,925

SUMMARY

Technical Problem

For the modified chlorinated polyolefin resin described in Patent Literature 1, performance as the binder such as adhesiveness is improved compared with conventional resins. However, in the case where the modified chlorinated polyolefin resin described in Patent Literature 1 is dissolved in a solvent and the dissolved modified chlorinated polyolefin resin is stored in a state of the solution for a long period of time, phenomena such as separation of the solution and generation of an agglomerated product occur and thus solution properties may be deteriorated.

Therefore, a resin composition in which the performance as the binder such as the adhesiveness is excellent and, at the same time, the solution properties are favorably retained even after the solution is stored for a long period of time is required.

Solution to Problem

The present invention provides the following.

[1] A modified polyolefin resin composition comprising: a modified polyolefin resin (C), wherein
the modified polyolefin resin (C) is a resin made by modifying a polymer (A) that is a polymer (a) of a polyolefin resin or a chlorinated polyolefin resin and an α,β-unsaturated carboxylic acid derivative having a structure derived from at least one carboxy group or a chlorinated product (b) thereof with a modification component comprising an alcohol (B), and
a residual ratio of the structure derived from at least one carboxy group in the modified polyolefin resin (C) is 50% or more and 80% or less.

[2] The modified polyolefin resin composition according to [1], wherein
the α,β-unsaturated carboxylic acid derivative is an α,β-unsaturated polycarboxylic acid cyclic anhydride, and
the structure derived from at least one carboxy group is a structure represented by —(C=O)—O—(C=O)—.

[3] The modified polyolefin resin composition according to [1] or [2], wherein
the modification component further comprises a monomer (I) represented by the following general formula (1)

[Chemical Formula 1]

$$H_2C=\underset{\underset{O}{\|}}{C}(R^1)-O-(CH_2)_m-O-(R^2-O)_n-H \quad (1)$$

(in the general formula (1), $R^1$ represents a hydrogen atom or a methyl group; m represents an integer of 1 to 4; $R^2$ represents a divalent organic group; and n represents an integer of 0 to 3).

[4] The modified polyolefin resin composition according to [3], wherein the modified polyolefin resin (C) is modified with the monomer (I) in an amount of 2.1 mol or more and 50 mol or less relative to 1 mol of the polymer (A).

[5] The modified polyolefin resin composition according to any one of [1] to [4], wherein
the modification component further comprises a monomer (II) represented by the following general formula (2)

$$CH_2=C(R^3)COOR^4 \quad (2)$$

(in the general formula (2), $R^3$ represents a hydrogen atom or a methyl group; $R^4$ represents a hydrogen atom or a group represented by $-C_nH_{2n+1}$; with the proviso that n represents an integer of 1 to 18).

[6] The modified polyolefin resin composition according to any one of [1] to [5], wherein the polymer (A) is chlorinated.

[7] The modified polyolefin resin composition according to any one of [1] to [6], wherein the alcohol (B) is an alcohol having a carbon atom number of 1 to 10.

[8] A primer comprising the modified polyolefin resin composition according to any one of [1] to [7].

[9] A paint comprising the modified polyolefin resin composition according to any one of [1] to [7].

[10] An ink comprising the modified polyolefin resin composition according to any one of [1] to [7].

[11] A method for producing a modified polyolefin resin composition, the method comprising:
a step (1) of polymerizing a polyolefin resin or a chlorinated polyolefin resin and an α,β-unsaturated carboxylic acid derivative having a structure derived from at least one carboxy group to make a polymer (a); and
a step (2) of modifying a polymer (A) that is the polymer (a) or a chlorinated product (b) thereof with a modification component comprising an alcohol (B) to make a modified polyolefin resin composition comprising a modified polyolefin resin (C), wherein
a residual ratio of the structure derived from at least one carboxy group in the modified polyolefin resin (C) is 50% or more and 80% or less.

[12] The method for producing a modified polyolefin resin composition according to [11], wherein
the α,β-unsaturated carboxylic acid derivative is an α,β-unsaturated polycarboxylic acid cyclic anhydride; and the structure derived from at least one carboxy group is a structure represented by —(C=O)—O—(C=O)—.

[13] The method for producing a modified polyolefin resin composition according to [11] or [12], wherein
the modification component further comprises a monomer (I) represented by the following general formula (1)

[Chemical Formula 2]

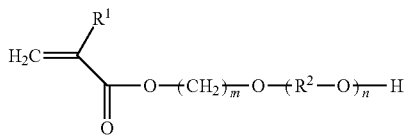

(1)

(in the general formula (1), $R^1$ represents a hydrogen atom or a methyl group; m represents an integer of 1 to 4; $R^2$ represents a divalent organic group; and n represents an integer of 0 to 3).

[14] The method for producing a modified polyolefin resin composition according to any one of [11] to [13], wherein
the modification component further comprises a monomer (II) represented by the following general formula (2)

$$CH_2=C(R^3)COOR^4 \quad (2)$$

(in the general formula (2), $R^3$ represents a hydrogen atom or a methyl group; $R^4$ represents a hydrogen atom or a group represented by —$C_nH_{2n+1}$; with the proviso that n represents an integer of 1 to 18).

Advantageous Effects of Invention

According to the present invention, the resin composition having excellent performance as the binder such as the adhesiveness and, at the same time, retaining solution properties favorably even after the solution is stored for a long period of time can be provided.

DESCRIPTION OF EMBODIMENTS

Hereinafter, embodiments for implementing the present invention will be described. However, the present invention is not limited to the embodiments and the exemplified products and can be implemented with any modification in the range of not departing from the claims of the present invention and equivalent ranges of the claims.

In the present specification, a number average molecular weight is a value that is calculated by measuring the resin with gel permeation chromatography (GPC) using polystyrene as a standard substance.

In the present specification, the term "(meth)acrylate" includes acrylate and methacrylate and means acrylate and methacrylate or acrylate or methacrylate.

In the present specification the term "(meth)acrylic acid" includes acrylic acid and methacrylic acid and means acrylic acid and methacrylic acid or acrylic acid or methacrylic acid.

[1. Modified Polyolefin Resin Composition]

The modified polyolefin resin composition of the present embodiment includes the modified polyolefin resin (C). The modified polyolefin resin (C) is a resin made by modifying a polymer (A) that is a polymer (a) of a polyolefin resin or a chlorinated polyolefin resin and an α,β-unsaturated carboxylic acid derivative having a structure derived from at least one carboxy group or the chlorinated product (b) of the polymer (a) with a modification component including an alcohol (B). In the modified polyolefin resin composition of the present embodiment, the residual ratio of the structure derived from at least one carboxy group in the modified polyolefin resin (C) is 50% or more and 80% or less.

[Polymer (A)]

The polymer (A) is the polymer (a) of a polyolefin resin or a chlorinated polyolefin resin and an α,β-unsaturated carboxylic acid derivative or the chlorinated product (b) of the polymer (A).

[Polyolefin Resin]

The polyolefin resin is a polymer of olefin. Examples of the polyolefin resin include polypropylene and copolymers of propylene and α-olefin (for example, ethylene, 1-butene, 1-pentene, 1-hexene, 1-heptene, 1-octene, and 4-methyl-1-pentene). A polyolefin resin obtained by random copolymerization of propylene and α-olefin may be referred to as a propylene-based random copolymer. Examples of the propylene-based random copolymer include an ethylene-propylene random copolymer, a propylene-butene random copolymer, and an ethylene-propylene-butene random copolymer.

In the case where the polyolefin resin is a copolymer of a plural kinds of olefins, the polyolefin resin may be a random copolymer or may be a block copolymer.

In the case where the polyolefin resin is a copolymer of propylene and olefin other than propylene, the content of the propylene unit in the polyolefin resin is preferably 50% by mass or more due to improvement in the adhesiveness of a coated film to a polypropylene substrate. The content is preferably 98% by mass or less because the flexibility of the coated film can be excellent.

The stereochemical structure of the polyolefin resin is not particularly limited. Examples of the stereochemical structure include an atactic structure, an isotactic structure, and a syndiotactic structure. The isotactic structure and the syndiotactic structure are preferable and the syndiotactic structure is more preferable.

In the case where the polyolefin resin is polypropylene, the polyolefin resin is preferably crystalline polypropylene, more preferably isotactic polypropylene and syndiotactic polypropylene, and further preferably the isotactic polypropylene.

As the polyolefin resin, a resin obtained by polymerizing the olefin may be used as it is or a resin provided by degradation such as thermal degradation may be used.

The number average molecular weight Mn of the polyolefin resin is preferably 5,000 or more. In addition, the number average molecular weight Mn is preferably 150,000 or less.

The polyolefin resin may be used singly or in combination of two or more polyolefin resins.

[Chlorinated Polyolefin Resin]

The chlorinated polyolefin resin is a resin obtained by chlorinating the polyolefin resin. Examples and preferable examples of the polyolefin resin for obtaining the chlorinated polyolefin resin are the same as the examples and preferable examples described in the section of [Polyolefin resin].

A chlorination method for obtaining the chlorinated polyolefin resin from the polyolefin resin is not particularly limited. Examples of the method include a method for dispersing or dissolving the polyolefin resin in a solvent such as carbon tetrachloride and chloroform and blowing chlorine gas into the dispersion or solution under use of radical generator or radiation of ultraviolet rays to chlorinate the polyolefin resin.

At the time of blowing the chlorine gas, the reaction system may be pressurized or may be under normal pressure.

The temperature of the chlorination reaction may be, for example, 50° C. or more and 120° C. or less.

The radical generator can be selected from known radical generators. Examples of the radical generator include peroxides (for example, di-tert-butylperoxide, tert-butyl hydroperoxide, dicumylperoxide, benzoylperoxide, tert-butylperoxide benzoate, methyl ethyl ketone peroxide, and di-tert-butyl diperphthalate) and azonitriles (for example, azobisisobutyronitrile).

The radical generator may be used singly or in combination of two or more radical generators.

After the polyolefin resin is chlorinated to prepare the chlorinated polyolefin resin, a stabilizer may be added.

As the stabilizer, for example, stabilizers used for resins containing chlorine atoms such as polyvinyl chloride may be used. Examples of the stabilizer include metallic soaps (for example, calcium stearate and lead stearate), metal oxides (for example, lead oxide), inorganic acid salts (for example, tribasic lead sulfate), organometallic compounds (dibutyltin dilaurate and dibutyltin malate), hydrotalcite compounds, and epoxy compounds.

The epoxy compound is preferable as the stabilizer. Examples of the epoxy compound include fats and oils obtained by epoxidizing natural fats and oils having an unsaturated group with peracids such as peracetic acid (for example, epoxidized soybean oil and epoxidized linseed oil); epoxidized fatty acid esters obtained by epoxidizing esters of unsaturated fatty acids (for example, oleic acid, tall oil fatty acid, and soybean oil fatty acid); epoxidized alicyclic compounds (for example, epoxidized tetrahydrophthalate); condensation products obtained by condensing bisphenols such as bisphenol A or polyvalent alcohols with epichlorohydrin (for example, bisphenol A glycidyl ether, ethylene glycol glycidyl ether, propylene glycol glycidyl ether, glycerol polyglycidyl ether, and sorbitol polyglycidyl ether); and monoepoxy compounds (for example, butyl glycidyl ether, 2-ethylhexyl glycidyl ether, decyl glycidyl ether, stearyl glycidyl ether, allyl glycidyl ether, phenyl glycidyl ether, sec-butylphenyl glycidyl ether, tert-butylphenyl glycidyl ether, phenol polyethyleneoxide glycidyl ether).

The dispersion liquid or solution of the chlorinated polyolefin resin may be obtained by removing the reaction solvent from the reaction mixture of the chlorination, and thereafter adding a solvent such as toluene or xylene together with the stabilizer to replace the reaction solvent with another solvent.

The solid product of the chlorinated polyolefin resin may be obtained by concentrating the reaction mixture of the chlorination under reduced pressure, adding the stabilizer, and thereafter removing a large part of the reaction solvent. As an apparatus for removing a large part of the reaction solvent from the reaction mixture including the chlorinated polyolefin resin, for example, an extruder equipped with a vent in which a vent port for removing the solvent under reduced pressure is installed can be used.

As the chlorinated polyolefin resin, a resin obtained by chlorinating the polyolefin resin may be used as it is or a resin provided by degradation such as thermal degradation may be used.

[α,β-Unsaturated Carboxylic Acid Derivative]

The α,β-unsaturated carboxylic acid derivative has a structure derived from at least one carboxy group.

The α,β-unsaturated carboxylic acid derivative is preferably an α,β-unsaturated polycarboxylic acid cyclic anhydride. The α,β-unsaturated polycarboxylic acid cyclic anhydride has a structure represented by —(C=O)—O—(C=O)— as the structure derived from at least one carboxy group.

The α,β-unsaturated polycarboxylic acid cyclic anhydride is a compound forming a ring structure including the structure represented by —(C=O)—O—(C=O)— by condensing two carboxylic acids that the α,β-unsaturated polycarboxylic acid has.

Examples of α,β-unsaturated polycarboxylic acid cyclic anhydrides include maleic anhydride, citraconic anhydride, itaconic anhydride, and aconitic anhydride. Of these anhydrides, maleic anhydride or aconitic anhydride is preferable.

The α,β-unsaturated carboxylic acid derivative may be used singly or in combination of two or more derivatives.

[Method for Polymerizing Polyolefin Resin or Chlorinated Polyolefin Resin and α,β-Unsaturated Carboxylic Acid Derivative]

As the method for polymerizing polyolefin resin or chlorinated polyolefin resin and the α,β-unsaturated carboxylic acid derivative, known methods may be used. Examples of the method include a method of melting the polyolefin resin or the chlorinated polyolefin resin or dissolving the polyolefin resin or the chlorinated polyolefin resin into a solvent, and adding the α,β-unsaturated carboxylic acid derivative and the radical generator to obtain the polymer.

Examples of the radical generator include the radical generators exemplified in the section of [Chlorinated polyolefin resin].

As a reaction apparatus, for example, extruders such as a twin screw extruder may be used.

The reaction may be carried out by a batch method or may be carried out by a continuous method.

Usually, the polymerization of the polyolefin resin or the chlorinated polyolefin resin and the α,β-unsaturated carboxylic acid derivative allows a graft copolymer having the polyolefin or the chlorinated polyolefin as the main chain and a side chain including the constitutional unit derived from the α,β-unsaturated carboxylic acid derivative to be provided.

The grafting ratio of the α,β-unsaturated carboxylic acid derivative is preferably 1% by mass or more because the reactivity of the polymer (A) with the modification components such as alcohol (B) is improved and the clouding and phase separation of the modified polyolefin resin composition can be reduced. The grafting ratio is preferably 10% by mass or less because gelation of the reaction liquid when the polymer (A) is modified is prevented and the adhesiveness of the modified polyolefin resin composition to the polyolefin substrate is improved.

The grafting ratio of the α,β-unsaturated carboxylic acid derivative (preferably the α,β-unsaturated polycarboxylic acid cyclic anhydride) can be measured by known methods. For example, the grafting ratio can be determined by an alkaline titration method or a Fourier transform infrared spectroscopy.

[Chlorinated Product (b)]

The polymer (a) is obtained by polymerizing the polyolefin resin or the chlorinated polyolefin resin and the α,β-unsaturated carboxylic acid derivative. As the polymer (A), the polymer (a) may be used or the chlorinated product (b) in which the polymer (a) is further chlorinated may be used.

The method for further chlorinating the polymer (a) is not particularly limited. Examples and preferable examples of the method for further chlorinating the polymer (a) are the same as the examples and preferable examples described in the section of [Chlorinated polyolefin resin].

The stabilizer may be added after the polymer (a) is chlorinated. Examples and preferable examples of the stabilizer are the same as the examples and preferable examples described in the section of [Chlorinated polyolefin resin].

Examples of the method for treating the reaction mixture after the chlorination of the polymer (a) include the same methods as the methods described in the section of [Chlorinated polyolefin resin]. Examples of the method include a method for removing the reaction solvent from the reaction mixture, and thereafter adding a solvent such as toluene or xylene together with the stabilizer and replacing the reaction solvent with another solvent to provide the dispersion liquid or solution of the polymer (A) and a method for concentrating the reaction mixture under reduced pressure, adding the stabilizer, and thereafter removing a large part of the reaction solvent to provide the solid product of the polymer (A).

[Composition of Polymer (A) and the Like]

In the case where the polymer (A) is chlorinated, the chlorine content ratio in the polymer (A) is preferably 5% by weight or more and more preferably 15% by weight or more because the properties of the solution of the modified polyolefin resin composition can be better. The chlorine content is preferably 50% by weight or less and more preferably 40% by weight or less because the adhesiveness of the modified polyolefin resin composition to the polyolefin substrate is improved. The chlorine content can be measured in accordance with JIS-K7229: 1995.

The number average molecular weight of the polymer (A) is preferably 10,000 or more and more preferably 30,000 or more. The number average molecular weight is preferably 200,000 or less and more preferably 100,000 or less.

[Modification Components]

The modified polyolefin resin (C) is a resin in which the polymer (A) is modified with the modification components. The modification components include the alcohol (B). The modification components including the alcohol (B) result in improving the stability of the modified polyolefin resin composition in the form of the solution.

It is presumed that the reason why the stability of the modified polyolefin resin composition in the form of a solution is improved is that the structure derived from at least one carboxy group is converted into a more stable structure (preferably an ester) by reacting the structure derived from at least one carboxy group (preferably, the structure represented by —(C=O)—O—(C=O)—) that the polymer (A) has with the alcohol (B).

[Alcohol (B)]

Examples of the alcohol (B) include aliphatic alcohols (for example, methanol, ethanol, n-propyl alcohol, isopropyl alcohol, n-butyl alcohol, isobutyl alcohol, sec-butyl alcohol, tert-butyl alcohol, 2-ethyl-hexanol 1-pentanol, 1-hexanol, 1-heptanol, 1-octanol, 1-nonanol, and 1-decanol) and the aliphatic alcohols are preferable.

The alcohol (B) is preferably an alcohol having a carbon atom number of 1 to 10, more preferably an alcohol having a carbon atom number of 1 to 4, further preferably one or more alcohols selected from the group consisting of methanol, ethanol, n-propyl alcohol, isopropyl alcohol, n-butyl alcohol, isobutyl alcohol, sec-butyl alcohol, and tert-butyl alcohol, and particularly preferably one or more alcohols selected from the group consisting of ethanol, n-propyl alcohol, and n-butyl alcohol.

The alcohol (B) may be used singly or in combination of two or more alcohols (B).

[Added Amount of Alcohol (B)]

The added amount of the alcohol (B) is preferably 2 mol or more, more preferably 6 mol or more, and further preferably 10 mol or more relative to 1 mol of the structure derived from at least one carboxy group (preferably the structure represented by —(C=O)—O—(C=O)—) that the polymer (A) has. The added amount is preferably 40 mol or less, more preferably 30 mol or less, and further preferably 20 mol or less.

[Monomer (I)]

The modification components may further include a monomer (I) represented by the following general formula (1).

[Chemical Formula 3]

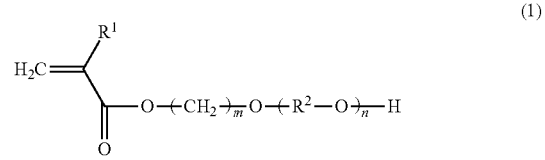

(1)

In the general formula (1), $R^1$ represents a hydrogen atom or a methyl group; m represents an integer of 1 to 4; $R^2$ represents a divalent organic group; and n represents an integer of 0 to 3.

The divalent organic group means a divalent group containing at least one carbon atom.

Examples of the divalent organic group include an alkylene group, a cycloalkylene group, and a group represented by the following general formula (1-1).

The alkylene group as the divalent organic group may be linear or may be branched.

In the case where the divalent organic groups exist, the divalent organic groups may be the same as or different from each other.

[Chemical Formula 4]

(1-1)

In the above general formula (1-1), $R^{21}$ represents an alkylene group or a cycloalkylene group.

The alkylene group represented by $R^{21}$ may be linear or may be branched.

The divalent organic group is preferably a group represented by the above general formula (1-1).

$R^{21}$ is preferably an alkylene group, more preferably an alkylene group having a carbon atom number of 1 to 10, further preferably an alkylene group having a carbon atom number of 1 to 6, and particularly preferably an alkylene group represented by the following general formula (1-1-1).

[Chemical Formula 5]

(1-1-1)

The monomer (I) represented by the general formula (1) is particularly preferably a monomer (I) represented by the general formula (1a).

[Chemical Formula 6]

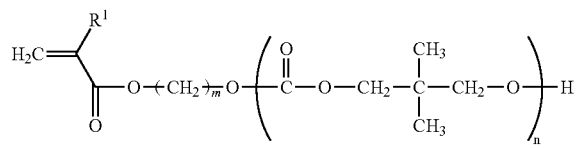

(1a)

In the above general formula (1a), m represents an integer of 1 to 4 and n represents an integer of 0 to 3.

Including the monomer (I) in the modification components allows the reaction liquid having higher uniformity and transparency to be obtained at the time of the modification reaction.

It is presumed that the reason is that the hydroxy group that the monomer (I) has is reacted with the carboxy group that the polymer (A) has or the structure derived from at least one carboxy group to form an ester and that graft copolymerization reaction is promoted by acting the carbon-carbon double bond in the esterification-reacted monomer (I) as the reaction starting point.

In the case where m is an integer of 4 or less, the reaction liquid having higher uniformity and transparency is formed at the time of the modification reaction. In the case where n is an integer of 3 or less, the reaction liquid having higher uniformity and transparency is formed at the time of the modification reaction.

n is preferably an integer of 1 or more and 3 or less.

The monomer (I) may be used singly or in combination of two or more monomers (I).

The monomer (I) can be produced by conventionally known methods. Commercially available products may also be used as the monomer (I).

As the commercially available product, "Placcel HEMAC 1" (a monomer represented by the above general formula (1a), with proviso that $R^1$ is a methyl group; m is 2; and n is 1) manufactured by Daicel Co., Ltd. can be used.

The modified polyolefin resin (C) is preferably modified with 2.1 mol or more of the monomer (I) relative to 1 mol of the polymer (A). This allows the clouding of the reaction liquid and the separation of the reaction liquid into two layers during the modification reaction to be prevented and thus the reaction liquid having higher uniformity and transparency can be formed.

The modified polyolefin resin (C) is preferably modified with 50 mol or less of the monomer (I) relative to 1 mol of the polymer (A). This allows the gelation of the reaction liquid during the modification reaction to be prevented and the adhesiveness of the modified polyolefin resin composition to the polyolefin substrate to be excellent.

Here, 1 mol of the polymer (A) is an amount based on the number average molecular weight.

[Monomer (II)]

The modification components may further include a monomer (II) represented by the following general formula (2).

$$CH_2=C(R^3)COOR^4 \quad (2)$$

In the above general formula (2), $R^3$ represents a hydrogen atom or a methyl group, and $R^4$ represents a hydrogen atom or a group represented by $-C_nH_{2n+1}$. Here, n represents an integer of 1 to 18.

Examples of the monomer (II) include (meth)acrylic acid, methyl (meth)acrylate, ethyl (meth)acrylate, n-butyl (meth)acrylate, 2-ethylhexyl (meth)acrylate, and lauryl (meth) acrylates.

[Other Monomers]

The modification components may include polymerizable monomers other than the alcohol (B), the monomer (I), and the monomer (II).

Examples of other monomers include α,β-unsaturated carboxylic acids (for example, acrylic acid, methacrylic acid, maleic acid, citraconic acid, fumaric acid, mesaconic acid, itaconic acid, and aconitic acid), (meth)acrylic acid esters other than the monomer (I) and the monomer (II) (for example, cycloalkyl (meth)acrylates such as cyclohexyl (meth)acrylate; and glycidyl (meth)acrylate; and hydroxyalkyl (meth)acrylates other than the monomer (I) such as 2-hydroxyethyl (meth)acrylate), (meth)acrylonitrile, and monomers containing a vinyl group (for example, styrene and vinyl acetate).

As other monomers, a macromonomer having a polymerizable (meth)acryloyl group at the end of polystyrene or poly(meth)acrylate may be used.

[Method for Modifying with Modification Components]

Examples of the method for modifying the polymer (A) with the alcohol (B) include a method in which the polymer (A) and the alcohol (B) are dispersed or dissolved in an appropriate solvent and reacted.

In the case where the polymer (A) is also modified with modification components other than the alcohol (B), the polymer (A) may be modified with the alcohol (B) at any time. For example;

The polymer (A) may be modified with modification components other than the alcohol (B) and thereafter modified with the alcohol (B).

The polymer (A) may be modified with the alcohol (B) and thereafter modified with the modification components other than the alcohol (B).

The polymer (A) may be first modified with a part of modification components other than the alcohol (B), subsequently modified with the alcohol (B), and subsequently modified with the remaining components of the modification components other than the alcohol (B).

The polymer (A) may be simultaneously modified with the alcohol (B) and at least one of the modification components other than the alcohol (B).

The modification components preferably further include the monomer (I) and the monomer (II) in addition to the alcohol (B) and a step (2-i) for modifying the polymer (A) with the monomer (I), a step (2-ii) for modifying the polymer (A) with the alcohol (B), and a step (2-iii) for modifying the polymer (A) with the monomer (II) are preferably carried out in any one of the sequences of I to III described below.

Sequence I: The step (2-i), the step (2-ii), and the step (2-iii) are carried out in this order.

Sequence II: The step (2-i) is carried out and thereafter the step (2-ii) and the step (2-iii) are simultaneously carried out.

Sequence III: The step (2-i), the step (2-iii), and the step (2-ii) are carried out in this order.

More preferably, the step (2-i), the step (2-ii), and the step (2-iii) are carried out in this order.

Examples of the method for modifying the polymer (A) with the monomer (I) and/or the monomer (II) include a method for dispersing or dissolving the polymer (A) in a suitable solvent, adding the radical generator (a polymerization initiator), and adding the monomer (I) and/or the monomer (II) to react and a method for dispersing or dissolving the polymer (A) in a suitable solvent, adding the monomer (I) and/or the monomer (II), and thereafter adding the polymerization initiator to react. The monomer (I) and/or the monomer (II) may be added in all amounts thereof at once, may be added continuously, or may be added separately in several times to the reaction system. In the case of the modification reaction, the reaction system is usually heated. The heating may be carried out before, at the same time as, or after the addition of the radical generator. The heating is preferably started before adding the radical generator.

As a method of modifying the polymer (A) with other monomers other than the monomer (I) and the monomer (II), the method may be carried out depending on the type of other monomers. For example, the same method as the method for modifying the polymer (A) with the monomer (I) and/or the monomer (II) may be included.

The radical generator for modifying the polymer (A) can be appropriately selected from known radical generators. For example, the same radical generator as the radical generator described in the section of [Chlorinated polyolefin] may be included.

The radical generator for modifying the polymer (A) may be used singly or in combination of two or more radical generators.

Examples of the solvent used for the modification reaction include aromatic compound solvents (for example, toluene and xylene), carboxylic acid ester solvents (for example, ethyl acetate and butyl acetate), ketone solvents (for example, methyl ethyl ketone and methyl isobutyl ketone), alcohol solvents (for example, ethanol, isopropyl alcohol, and n-butyl alcohol), aliphatic hydrocarbon solvents, alicyclic hydrocarbon solvents, and mixed solvents formed by mixing these solvents in any ratio.

The solvent used for the modification reaction is preferably the aromatic compound solvents and more preferably aromatic hydrocarbon solvents (for example toluene and xylene).

In the present specification, the solvent includes a dispersion medium.

[Residual Ratio of Structure Derived from at Least One Carboxy Group]

The residual ratio of the structure derived from at least one carboxy group in the modified polyolefin resin (C) is 50% or more and 80% or less. Here, the structure derived from at least one carboxy group is the same as the structure derived from at least one carboxy group that the α,β-unsaturated carboxylic acid derivative has and is preferably the structure represented by —(C═O)—O—(C═O)—.

The residual ratio is a ratio of the number of the structure derived from at least one carboxy group existing in the modified polyolefin resin (C). Here, in the step of modifying the polymer (A) with the modification components including the alcohol (B), the residual ratio of the polymer (A) (or modified product of the polymer (A) in the case where the polymer (A) is modified with the modification components other than the alcohol (B) before modifying with the alcohol (B)) immediately before adding the alcohol (B) to the reaction system is determined to be 100%.

The residual ratio of the structure derived from at least one carboxy group in the modified polyolefin resin (C) can be determined, for example, as follows.

Immediately before adding the alcohol (B) to the reaction system, each of the infrared absorption spectrum of the polymer (A) or the modified product of the polymer (A) and the infrared absorption spectrum of the modified polyolefin resin (C) is measured. Each value obtained by dividing the area of the peak specific to the structure by the area of the peak specific to the polyolefin is calculated and determined to be Aa and Ac, respectively. The residual ratio can be determined by calculating Ac/Aa×100.

In the case where the α,β-unsaturated carboxylic acid derivative is the α,β-unsaturated polycarboxylic acid cyclic anhydride and the structure derived from at least one carboxy group is the structure represented by —(C═O)—O—(C═O)—, for example, the peak existing in the vicinity of 1780 cm$^{-1}$ can be used as a peak specific to the structure derived from at least one carboxy group (the structure represented by —(C═O)—O—(C═O)—).

The peak existing in the vicinity of 1450 cm$^{-1}$ can be used as the peak specific to the polyolefin.

The residual ratio of the structure derived from at least one carboxy group in the modified polyolefin resin (C) is preferably 55% or more, and preferably 70% or less.

The modified polyolefin resin (C) having the residual ratio of the structure in the above range allows the modified polyolefin resin composition in which the adhesiveness is excellent and, at the same time, the solution properties are favorably retained even after the solution is stored for a long period of time to be obtained.

The viscosity Va of a resin (C') produced by the same procedure as the modified polyolefin resin (C) except that the alcohol (B) is not added and the viscosity Vb of the modified polyolefin resin (C) preferably satisfy the following formula (V1).

$$30 \leq (Va-Vb)/Va \times 100 \leq 80 \quad \text{Formula (VI)}$$

Here, in the present specification, the viscosity is a value measured in accordance with the following method.

The viscosity is the value determined by controlling the temperature of the measurement sample at 25° C. in a constant-temperature chamber and measuring the sample using a B-type viscometer (manufactured by Toki Sangyo Co., Ltd., BMII-type Viscometer) under a condition of a rotation speed of 60 rpm. Here, the concentration of the sample is 35% by weight.

The viscosity Va and the viscosity Vb satisfying the formula (V1) can be achieved by, for example, adjusting the added amount of alcohol (B). For example, an increase in the amount of the added alcohol (B) allows the viscosity Vb of the modified polyolefin resin (C) to be decreased, and as a result, the value of (Va−Vb)/Va×100 to be increased. On the other hand, a decrease in the added amount of the alcohol (B) allows the viscosity Vb of the modified polyolefin resin (C) to be increased, and, as a result, the value of (Va−Vb)/Va×100 to be increased.

The reason why the value of the viscosity Vb of the modified polyolefin resin (C) can be increased or decreased depending on the added amount of the alcohol (B) as described above is as follows.

It is presumed that the structure derived from at least one carboxy group that the polymer (A) has (preferably the structure represented by —(C═O)—O—(C═O)—) is reacted with the hydroxy group of the alcohol (B), thus that the crosslink of the modified polyolefin resins (C) with each other is inhibited and that, as a result, the viscosity Vb of the modified polyolefin resin (C) is lowered. Therefore, it is presumed that the viscosity Vb of the modified polyolefin resin (C) can be controlled depending on the added amount of the alcohol (B).

[Optional Components]

The modified polyolefin resin composition may include optional components other than the modified polyolefin resin (C). Examples of such components include solvents; polyolefin resins; chlorinated polyolefin resins; resins other than polyolefin resins (for example, alkyd resins, acrylic resins, polyacrylic polyols, polyester resins, polyester polyols, polyether resins, polyether polyols, and polyurethane resins); modification components such as unreacted alcohol (B); pigments; additives (for example, ultraviolet ray absorbers, antioxidants, and pigment anti-settling agents).

The content of the optional components other than the modified polyolefin resin composition (C) included in the modified polyolefin resin composition may be, for example, 10% by mass or less, 5% by mass or less, 1% by mass or less, or 0% by mass relative to the modified polyolefin resin composition.

The content of the modified polyolefin resin (C) in the modified polyolefin resin composition may be appropriately determined depending on the applications of the modified polyolefin resin composition and is preferably 10% by mass or more and more preferably 20% by mass or more in order to improve the adhesiveness to various plastic substrates. The upper limit of the content may be 100% by mass or less, may be 90% by mass or less, or may be 80% by mass or less.

[Applications of Modified Polyolefin Resin Composition]

The modified polyolefin resin composition allows the adhesiveness to be excellent and the solution properties to be favorably retained even after the solution is stored for a long period of time and thus is suitably used for, for example, binders (for example, a binder for paints and a binder for inks), a primer, a paint, an ink, and an adhesive. Therefore, the present invention provides the binder, the primer, the paint, and the ink including the modified polyolefin resin composition.

The binders, primers, paints, and inks according to the present invention may include additives (for example, antioxidants, light stabilizers, ultraviolet ray absorbers, pigments, dyes, and inorganic fillers) other than the modified polyolefin resin composition, if necessary.

[2. Method for Producing Modified Polyolefin Resin Composition]

The above-described modified polyolefin resin composition can be produced by, for example, a method including the following steps (1) and (2) in this order.

[Step (1)]

The step (1) is a step of polymerizing the polyolefin resin or the chlorinated polyolefin resin and the α,β-unsaturated carboxylic acid derivative having the structure derived from at least one carboxy group to make the polymer (a).

The examples and preferable examples of the polyolefin resin, chlorinated polyolefin resin, and α,β-unsaturated carboxylic acid derivative are the same as the examples described in the section of [1. Modified polyolefin resin composition].

The method for polymerizing the polyolefin resin or the chlorinated polyolefin resin and the α,β-unsaturated carboxylic acid derivative having the structure derived from at least one carboxy group is the same as the example in the section of [Method for polymerizing polyolefin resin or chlorinated polyolefin resin and α,β-unsaturated carboxylic acid derivative].

A step (1') of chlorinating the polymer (a) to make the chlorinated product (b) of the polymer (a) after the step (1) and before the step (2) may be included. The examples of the method for chlorinating the polymer (a) are the same as the examples described in the section of [Chlorinated product (b)].

[Step (2)]

The step (2) is a step of modifying the polymer (A) that is the polymer (a) or the chlorinated product (b) of the polymer (a) with modification components including the alcohol (B) to make the modified polyolefin resin composition including the modified polyolefin resin composition (C).

The examples and preferable examples of the alcohol (B) and the examples and preferable examples of modification components other than the alcohol (B) are the same as the examples described in the section of [1. Modified polyolefin resin composition] and [Modification components].

The examples and the preferable examples of the method for modifying the polymer (A) with the modification components including the alcohol (B) are the same as the examples described in the section of [Method for modifying with modification components].

EXAMPLE

Hereinafter, the present invention will be described in detail with reference to Examples and Comparative Examples. The present invention, however, is not limited to Examples and Comparative Examples. In the following description, "part" means part by mass, unless otherwise noted.

[Evaluation Method]

[Number Average Molecular Weight]

The number average molecular weight of a sample was measured with GPC in accordance with the conditions described below.

GPC apparatus: Manufactured by TOSOH CORPORATION

Column: TSK-gel G-6000 H×L, G-5000 H×L, G-4000 H×L, G-3000 H×L, G-2000 H×L (manufactured by TOSOH CORPORATION)

Eluent: THF

Flow rate: 1.0 mL/minute

Pump oven and column oven temperature: 40° C.

Injection volume: 100 μL

Molecular weight reference material: Polystyrene ("Easical PS-1", supplied by Agilent Technology, Inc.)

[Amount of Structure Represented by —(C=O)—O—(C=O)— (mol/1 mol)]

The amount (mol) of the structure represented by —(C=O)—O—(C=O)— per 1 mol of the polymer (A) was measured with an alkali titration method.

[Chlorine Content Ratio (% by Mass)]

The chlorine content ratio was determined in accordance with JIS-K7229:1995.

[Solution Stability Test]

The resin solution was placed in a closed container and allowed to stand at 25° C. for 6 months. The solution properties after 6 months were visually observed to evaluate in accordance with the following evaluation criteria.

A: The solution has homogeneous and clear solution properties and has the solution appearance and viscosity that are not changed immediately after the production.

B: The solution has homogeneous and clear solution properties and an increase in viscosity is observed compared with the viscosity immediately after the production.

C: The phase separation of the solution and/or the generation of the agglomerate is confirmed.

[Residual Ratio of the Structure Presented by —(C═O)—O—(C═O)—]

The polymerization liquid was sampled immediately before addition of the alcohol (B) at the production of the modified polyolefin resin (C). The infrared absorption spectrum of the polymerization liquid was measured. The peak existing in the vicinity of 1780 cm$^{-1}$ was determined to be the peak specific to the structure. The value in which the area of this peak was divided by the area of the peak specific to polyolefin existing in the vicinity of 1450 cm$^{-1}$ was determined to be Aa. Subsequently, at the production of the modified polyolefin resin (C), the polymerization liquid after 1 hour from the addition of the alcohol (B) was sampled. The infrared absorption spectrum of the polymerization liquid was measured and thereafter the value Ac was determined by the same operation as the operation in determining the Aa. The residual ratio of the structure was determined by substituting the values Aa and Ac into the following formula.

Residual ratio=$Ac/Aa \times 100 (\%)$

[Viscosity]

The viscosity of the sample was determined under the following conditions.

The temperature of the solution of the modified polyolefin resin (C) was adjusted to 25° C. in a constant temperature chamber and the viscosity was measured using a B-type viscometer (manufactured by Toki Sangyo Co., Ltd., BMII-type viscometer) under a condition of a rotational speed of 60 rpm. Here, the concentration of the modified polyolefin resin (C) in the solution was 35% by weight.

Moreover, resin (C') was produced in accordance with the same procedure as the procedure at the production of the modified polyolefin resin (C) except that the alcohol (B) was not added. The viscosity of the solution of resin (C') was measured in the same method as the method of measuring of the viscosity of the solution of modified polyolefin resin (C).

The viscosity Va (Pa·s) of the resin (C') and the viscosity Vb (Pa·s) of the modified polyolefin resin (C) were measured and the viscosity change ratio (%) was determined in accordance with the following formula.

Formula: Viscosity change ratio=$(Va-Vb)/Va \times 100 (\%)$

[Primer Test]

The resin solution was diluted with xylene so that 100 mL of the solution was dropped over 12 seconds to 13 seconds at 20° C. using a Ford cup No. 4. Thereafter, the diluted resin solution was applied on the a polypropylene plate (TX-933A, manufactured by Mitsui Chemicals, Inc.) of which surface was washed with a neutral detergent with air spraying so that a film thickness of the applied resin solution was 10 μm to 15 μm and the applied resin solution was dried at room temperature for 20 minutes to make a primer-coated film. A clear coating (two-component curable urethane coating solution) was applied on the primer-coated film so that the film thickness was 30 μm. The applied clear coating was dried at room temperature for 30 minutes and thereafter subjected to baking treatment at 80° C. for 30 minutes to make a coated plate. After the coated plate was allowed to stand at room temperature for 24 hours, the following coated film tests (an adhesiveness test, a moisture resistance test, a warm water resistance test, a gasohol resistance test, and ultraviolet ray resistance test) were carried out to this coated plate.

[Adhesiveness Test]

On the coated surface, cut lines that reached the base polypropylene plate were formed at intervals of 1 mm so that 100 square sections were made and the strip of a cellophane tape (manufactured by Nichiban Co., Ltd) adhered onto the square sections. The adhering tape was peeled in a 180° direction and the number of the remaining sections on the substrate was evaluated in accordance with the following criteria. As the number of remaining sections becomes larger, the adhesiveness becomes better.

A: The number of remaining sections after tape peeling is 100.

B: The number of remaining sections after tape peeling is 99 to 81.

C: The number of remaining sections after tape peeling is 80 or less.

[Moisture Resistance Test]

The coated plate was allowed to stand in an atmosphere at 50° C. and at 98% relative humidity for 240 hours. After being allowed to stand for 240 hours, the state of the coated film was observed and the moisture resistance was evaluated in accordance with the following criteria.

A: No defects in the coated film are observed.

B: Parts of less than 10% of the entire coated film are lifted from the polypropylene plate.

C: Parts of 10% or more of the entire coated film are lifted from the polypropylene plate.

[Warm Water Resistance Test]

The coated plate was immersed in warm water at 40° C. for 240 hours. After the immersion for 240 hours, the state of the coated film was observed, and the warm water resistance was evaluated in accordance with the following criteria.

A: No defects in the coated film are observed.

B: Parts of less than 10% of the entire coated film are lifted from the polypropylene plate.

C: Parts of 10% or more of the entire coated film are lifted from the polypropylene plate.

[Gasohol Resistance]

On the coated film, cross-shaped scratches reaching the substrate was formed and the sample was immersed in gasoline/ethanol=9/1 (volume ratio). The state of the immersed coated film was observed and the gasohol resistance was evaluated in accordance with the following criteria.

A: No coated film peeling is observed after immersion for 2 hours.

B: Coated film peeling is observed after immersion for 2 hours but no coated film peeling is observed after immersion for 1 hour.

C: Coated film peeling is observed after immersion for 1 hour.

[Ultraviolet Ray Resistance]

The ultraviolet ray resistance of the coated plate was tested using a QUV accelerated weatherability tester (manufactured by Q-PANEL COMPANY). At the time of a QUV exposure time of 1,000 hours, the same test as the test in [Adhesiveness test] was carried out and the ultraviolet ray resistance of the coated film was evaluated in accordance with the following criteria.

A: The number of remaining sections after tape peeling is 100.

B: The number of remaining sections after tape peeling is 99 to 81.

C: The number of remaining sections after tape peeling is 80 or less.

Production Example 1

One hundred parts of a propylene-based random copolymer (propylene unit content: 96% by weight, ethylene unit content: 4% by weight) as the polyolefin resin prepared by using a metallocene catalyst as the polymerization catalyst, 4 parts of maleic anhydride as the α,β-unsaturated polycarboxylic acid cyclic anhydride, and 2 parts of di-t-butyl peroxide as the radical generator were uniformly mixed and supplied to a twin-screw extruder (L/D=60, diameter=15 mm, the first barrel to the fourteenth barrel).

The reaction was carried out under conditions of a residence time of 10 minutes, a rotation speed of 200 rpm, and barrel temperatures of 100° C. (first and second barrels), 200° C. (third to eighth barrels), 90° C. (ninth and tenth barrels), and 110° C. (eleventh to fourteenth barrels). Thereafter, unreacted maleic anhydride was removed by carrying out reduced pressure treatment to make a maleic anhydride-modified polypropylene resin as the polymer (a).

Into a glass-lined reaction vessel, 100 parts of the obtained maleic anhydride-modified polypropylene-based resin was charged. Chloroform was added into this reaction vessel and the resin was sufficiently dissolved at a temperature of 110° C. under a pressure of 2 kgf/cm². Thereafter, 2 parts of azobisisobutyronitrile as the radical generator was added. Chlorine gas was blown into the reaction vessel while the pressure in the reaction vessel was being controlled at 2 kgf/cm² to carry out chlorination.

After the completion of the reaction, 6 parts of an epoxy compound (Epocizer W-100EL, manufactured by Dainippon Ink and Chemicals, Inc.) was added as the stabilizer. The resultant mixture was supplied to a vented extruder equipped with a suction part for solvent removal on the screw shaft part. The solvent was removed and the mixture was solidified to make an acid-modified chlorinated polyolefin resin composition (A-1) having a number average molecular weight of 30,000 that was a chlorinated polyolefin resin as the chlorinated product (b) and the polymer (A) (the content of the structure represented by —(C=O)—O—(C=O)— in 1 mol of the resin composition=9.7 molar equivalent, and the chlorine content=20% by mass).

Production Example 2

In a four-necked flask equipped with a stirrer, a condenser, and a dropping funnel, 100 parts of propylene-based random copolymer (propylene unit content: 80% by weight, butene unit content: 15% by weight, ethylene unit content: 5% by weight) as the polyolefin resin produced by using a metallocene catalyst as the polymerization catalyst was completely dissolved in an oil bath at 180° C. Inside of the flask was purged with nitrogen for about 10 minutes, and thereafter 4 parts of aconitic anhydride as the α,β-unsaturated polycarboxylic acid cyclic anhydride was added over about 5 minutes with stirring and 0.4 part of di-tert-butylperoxide dissolved in 1 part of heptane was added from the dropping funnel over about 30 minutes.

Thereafter, the system was maintained at 180° C. and the reaction was further continued for one hour. Thereafter, the unreacted aconitic anhydride was removed over about one hour while the pressure in the flask was being reduced with an aspirator to make an aconitic anhydride-modified polypropylene-based resin as the polymer (a).

Into a glass-lined reaction vessel, 100 parts of the obtained aconitic anhydride-modified polypropylene-based resin was charged. Chloroform was added into this reaction vessel and chlorine gas was blown into the reaction vessel under a pressure of 2 kgf/cm² while the reaction solution was being irradiated with ultraviolet rays to carry out chlorination.

After the completion of the reaction, 6 parts of an epoxy compound (Epocizer W-100EL, manufactured by Dainippon Ink and Chemicals, Inc.) was added as the stabilizer. The resultant mixture was supplied to a vented extruder equipped with a suction part for solvent removal on the screw shaft part. The solvent was removed and the mixture was solidified to make an acid-modified chlorinated polyolefin-based resin composition (A-2) having a number average molecular weight of 50,000 that was a chlorinated polyolefin-based resin as the chlorinated product (b) and the polymer (A) (the content of the structure represented by —(C=O)—O—(C=O)— in 1 mol of the resin composition=12.0 molar equivalent, the chlorine content=5% by mass).

Production Example 3

An acid-modified chlorinated polyolefin-based resin composition (A-3) having a number average molecular weight of 10,000 as the chlorinated product (b) and the polymer (A) (the content of the structure represented by —(C=O)—O—(C=O)— in 1 mol of the resin composition=5.0 molar equivalent, the chlorine content=50% by mass) was obtained by the same method as the method in Production Example 1 except that a propylene-based random copolymer (propylene unit content: 80% by weight, ethylene unit content: 20% by weight) prepared by using a metallocene catalyst as the polymerization catalyst as the propylene-based random copolymer was used.

Production Example 4

One hundred parts of a propylene-based random copolymer (propylene unit content: 96% by weight, ethylene unit content: 4% by weight) prepared by using a metallocene catalyst as the polymerization catalyst and 2 parts of di-t-butyl peroxide were uniformly mixed and supplied to a twin-screw extruder (L/D=60, diameter=15 mm, the first barrel to the fourteenth barrel).

The reaction was carried out under conditions of a residence time of 10 minutes, a rotation speed of 200 rpm, and barrel temperatures of 100° C. (first and second barrels), 200° C. (third to eighth barrels), 90° C. (ninth and tenth barrels), and 110° C. (eleventh to fourteenth barrels) to make a polypropylene-based resin.

Into a glass-lined reaction vessel, 100 parts of the obtained polypropylene-based resin was charged. Chloroform was added into this reaction vessel and the resin was sufficiently dissolved at a temperature of 110° C. under a pressure of 2 kgf/cm². Thereafter, 2 parts of azobisisobutyronitrile was added and chlorine gas was blown into the reaction vessel while the pressure in the reaction vessel was being controlled at 2 kgf/cm² to carry out chlorination.

After the completion of the reaction, 6 parts of an epoxy compound (Epocizer W-100EL, manufactured by Dainippon Ink and Chemicals, Inc.) was added as the stabilizer. The resultant mixture was supplied to a vented extruder equipped with a suction part for solvent removal on the screw shaft part. The solvent was removed and the mixture was solidified to make an acid-modified chlorinated polyolefin-based resin composition (A-4) having a number average molecular weight of 30,000 that is a chlorinated polyolefin-based resin (the chlorine content=20% by mass).

Example 1

In 1,064 parts by weight of toluene, 100 parts by weight of the acid-modified chlorinated polypropylene resin composition (A-1) was dissolved and 5 parts by weight of an epoxy compound (Epocizer W-131, manufactured by DIC Corporation) was added. To this mixture, 5.5 parts by weight of a peroxyester-based peroxide (Perbutyl O, manufactured by NOF Corporation) was added at 85° C. under a nitrogen atmosphere. Thereafter, 15.0 parts by weight of dimethyltrimethylenecarbonate-modified ethyl methacrylate (hereinafter also referred to as HEMAC, trade name "Fluxel HEMAC 1" manufactured by Daicel Corporation, molecular weight of about 250) represented by the following formula (1a) (here, $R^1$ represents a methyl group; m represent 2; and n represents 1) as the monomer (I) was added and the resultant mixture was stirred for 1 hour. After stirring, 24 parts by weight of 1-butanol as the alcohol (B) was added and the resultant mixture was stirred for 1 hour. Thereafter, monomers (10 parts by weight of methacrylic acid, 270 parts by weight of methyl methacrylate, and 120 parts by weight of cyclohexyl methacrylate) listed in Table 2 as the polymerizable (meth)acrylic acid esters were added. The resultant mixture was reacted at 85° C. for 6 hours or more. Thereafter, the resultant solution was adjusted to prepare a toluene solution having a solid content concentration of 40% by weight and thus the solution (modified polyolefin resin composition) of the modified polypropylene resin (C-1) as the modified polyolefin resin (C) listed in Table 3 was obtained. The number average molecular weight of the modified polypropylene resin (C-1) was 80,000. The resin solution had homogenous and clear solution properties at the time when one day passed after production.

After 1 hour from the addition of 1-butanol as the alcohol (B), the polymerization liquid was sampled to determine the residual ratio of the structure represented by —(C=O)—O—(C=O)—.

The residual ratio of the structure after adding the monomers listed in Table 2 and carrying out the reaction at 85° C. for 6 hours or more was equal to the residual ratio of the structure after 1 hour from the addition of 1-butanol.

In Example 1, the step of modifying the polymer (A) was carried out in accordance with the above-described sequence I (modification with monomer (I), modification with alcohol (B), and modification with monomer (II)).

[Chemical Formula 7]

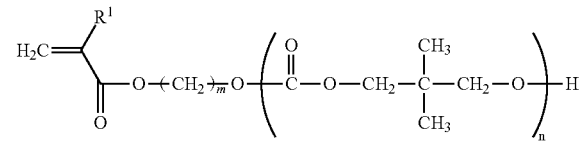

(1a)

Example 2

In 266 parts by weight of toluene, 100 parts by weight of the acid-modified chlorinated polypropylene resin composition (A-2) was dissolved and 5 parts by weight of an epoxy compound (Epocizer W-131, manufactured by DIC Corporation) was added. To this mixture, 5.5 parts by weight of a peroxyester-based peroxide (Perbutyl O, manufactured by NOF Corporation) was added at 85° C. under a nitrogen atmosphere. Thereafter, 25.0 parts by weight of HEMAC as the monomer (I) was added and 22 parts by weight of ethanol as the alcohol (B) and the formulation (5.0 parts by weight of methacrylic acid and 20.0 parts by weight of cyclohexyl methacrylate) listed in Table 2 as the polymerizable (meth)acrylic acid ester were simultaneously added. The resultant mixture was reacted at 85° C. for 6 hours or more. Thereafter, the resultant solution was adjusted to prepare a toluene solution having a solid content concentration of 40% by weight and thus the solution (modified polyolefin resin composition) of the modified polypropylene resin (C-2) as the modified polyolefin resin (C) listed in Table 3 was obtained. The number average molecular weight of the modified polypropylene resin (C-2) was 120,000. The resin solution had homogenous and clear solution properties at the time when one day passed after production.

Ethanol as the alcohol (B) was added and the polymerization liquid was sampled after 1 hour from the addition to determine the residual ratio of the structure represented by —(C=O)—O—(C=O)—.

The residual ratio of the structure after carrying out the reaction at 85° C. for 6 hours or more was the equal to the residual ratio of the structure after 1 hour from the addition of ethanol.

In Example 2, the step of modifying the polymer (A) was carried out in accordance with the above-described sequence II (modification with monomer (I) and modification with alcohol (B) and simultaneous modification with monomer (II)).

Example 3

In 426 parts by weight of toluene, 100 parts by weight of the acid-modified chlorinated polypropylene resin composition (A-3) was dissolved and 5 parts by weight of an epoxy compound (Eposizer W-131, manufactured by DIC Corporation) was added. To this mixture, 5.5 parts by weight of a peroxyester-based peroxide (Perbutyl O, manufactured by NOF Corporation) was added at 85° C. under nitrogen atmosphere. Thereafter, 7.5 parts by weight of HEMAC as the monomer (I) was added and the formulation (5.0 parts by weight of methacrylic acid, 31.0 parts by weight of methyl methacrylate, 60.0 parts by weight of cyclohexyl methacrylate, and 4.0 parts by weight of 2-hydroxyethyl acrylate) listed in Table 2 as the polymerizable (meth)acrylic acid ester was added and the resultant mixture was reacted at 85° C. for 6 hours or more. Thereafter, 16 parts by weight of 1-decanol as the alcohol (B) was added and the resultant solution was adjusted to prepare a toluene solution having a solid content concentration of 40% by weight and thus the solution (modified polyolefin resin composition) of the modified polypropylene resin (C-3) as the modified polyolefin resin (C) listed in Table 3 was obtained. The number average molecular weight of the modified polypropylene resin (C-3) was 30,000. The resin solution had homogenous and clear solution properties at the time when one day passed after production.

After 1 hour from the addition of 1-decanol as the alcohol (B), the polymerization liquid was sampled to determine the residual ratio of the structure represented by —(C=O)—O—(C=O)—.

In Example 3, the step of modifying the polymer (A) was carried out in accordance with the above-described sequence III (modification with monomer (I), modification with monomer (II), and modification with alcohol (B)).

Example 4

The solution (modified polyolefin resin composition) of the polypropylene-based resin (C-4) having a number average molecular weight of 70,000 listed in Table 3 was obtained by the same method as the method in Example 1 except that HEMAC was not added. The resin solution had homogenous and clear solution properties at the time when one day passed after production.

Comparative Example 1

The solution of the modified polypropylene-based resin (C-5) having a number average molecular weight of 60,000 listed in Table 3 was obtained by the same method as the method in Example 1 except that 100 parts by weight of the acid-modified chlorinated polypropylene-based resin composition (A-1) was dissolved in 709 parts by weight of toluene, that 16.7 parts by weight of HEMAC was used, that the formulation of the polymerizable (meth)acrylic acid ester was replaced with the formulation listed in Table 2, and that 1-butanol as the alcohol (B) was not used for the reaction. The resin solution had homogenous and clear solution properties at the time when one day passed after production.

Comparative Example 2

The solution of a modified polypropylene-based resin (C-6) having a number average molecular weight of 45,000 listed in Table 3 was obtained by the same method as the method in Example 1 except that 100 parts by weight of the acid-modified chlorinated polypropylene-based resin composition (A-1) was dissolved in 426 parts by weight of toluene, that 16.7 parts by weight of HEMAC was used, that 30 parts by weight of ethanol as the alcohol (B) was used, and that the formulation of the polymerizable (meth)acrylic acid ester was replaced with the formulation listed in Table 2. The resin solution had homogenous and clear solution properties at the time when one day passed after production.

Comparative Example 3

The solution of the modified polypropylene-based resin (C-7) having a number average molecular weight of 50,000 listed in Table 3 was obtained by the same method as the method in Example 1 except that 100 parts by weight of the acid-modified chlorinated polypropylene-based resin composition (A-4) was dissolved in 426 parts by weight of toluene, that 1.25 parts by weight of HEMAC was used, that 10 parts by weight of 1-propanol as the alcohol (B) was used, and that the formulation of the polymerizable (meth) acrylic acid ester was replaced with the formulation listed in Table 2. The resin solution had homogenous and clear solution properties at the time when one day passed after production.

In Table 1 below, the raw materials of the polymer (A) used in Examples and Comparative Examples, physical properties, and the like are listed.

TABLE 1

|  | Polymer (A) | Polyolefin resin P:E:B Ratio by mass | $\alpha,\beta$-Unsaturated polycarboxylic acid cyclic anhydride | Polymer (A) Number average molecular weight Mn | Chlorine content ratio (% by mass) |
|---|---|---|---|---|---|
| Example 1 | A-1 | P:E:B = 96:4:0 | MAH | 30,000 | 20 |
| Example 2 | A-2 | P:E:B = 80:5:15 | ACH | 50,000 | 5 |
| Example 3 | A-3 | P:E:B = 80:20:0 | MAH | 10,000 | 50 |
| Example 4 | A-1 | P:E:B = 96:4:0 | MAH | 30,000 | 20 |
| Comparative Example 1 | A-1 | P:E:B = 96:4:0 | MAH | 30,000 | 20 |
| Comparative Example 2 | A-1 | P:E:B = 96:4:0 | MAH | 30,000 | 20 |
| Comparative Example 3 | A-4 | P:E:B = 96:4:0 | — | 30,000 | 20 |

In Table 1,
[MAH] means maleic anhydride,
[ACH] means aconitic anhydride, and
[P:E:B] means [Propylene unit:Ethylene unit:Buten unit].
In Table 2 below, the polymer (A) and modification components used in each Example and Comparative Example are listed.

TABLE 2

|  | Polymer (A) | | | Modification component | | | | | | |
|---|---|---|---|---|---|---|---|---|---|---|
|  | | —(CO)—O—(CO)— Amount | | Alcohol (B) | | Monomer (I) | Added amount of polymerizable acrylic acid ester (g/100 g(A)) | | | |
|  | Type | (mol/1 mol) | Sequence | Type | Added amount (mol/1 mol) (—(CO)—O—(CO)—) | (mol/1 mol (A)) HEMAC | MAA (Monomer (II)) | MMA (Monomer (II)) | CHMA | HEA |
| Example 1 | A-1 | 9.7 | I | 1-Butanol | 10 | 18.2 | 10.0 | 270.0 | 120.0 | — |
| Example 2 | A-2 | 12 | II | Ethanol | 20 | 50.0 | 5.0 | — | 20.0 | — |
| Example 3 | A-3 | 5 | III | 1-Decanol | 2 | 3.0 | 5.0 | 31.0 | 60.0 | 4.0 |
| Example 4 | A-1 | 9.7 | I | 1-Butanol | 10 | — | 10.0 | 270.0 | 120.0 | — |
| Comparative Example 1 | A-1 | 9.7 | — | — | — | 20.1 | 20.0 | 40.0 | 20.0 | 20 |

TABLE 2-continued

| | Polymer (A) | | | Alcohol (B) | | Modification component Monomer (I) | Added amount of polymerizable acrylic acid ester (g/100 g(A)) | | | |
|---|---|---|---|---|---|---|---|---|---|---|
| | Type | —(CO)—O—(CO)— Amount (mol/1 mol) | Sequence | Type | Added amount (mol/1 mol) (—(CO)—O—(CO)—) | (mol/1 mol (A)) HEMAC | MAA (Monomer (II)) | MMA (Monomer (II)) | CHMA | HEA |
| Comparative Example 2 | A-1 | 9.7 | I | Ethanol | 23 | 20.1 | 15.0 | 45.0 | 40.0 | — |
| Comparative Example 3 | A-4 | — | I | 1-Propanol | 10 | 1.50 | 20.0 | 200.0 | 165.0 | 15.0 |

In Table 2,

[HEMAC] means dimethyltrimethylenecarbonate-modified ethyl methacrylate (Fluxel HEMAC 1, manufactured by Daicel Corporation),

[MAA] means methacrylic acid,

[MMA] means methyl methacrylate,

[CHMA] means cyclohexyl methacrylate, and

[HEA] means 2-hydroxyethyl acrylate.

The amount of the structure of the polymer (A) represented by —(C=O)—O—(C=O)— indicates the amount (mol) of the group contained in 1 mol of the polymer (A) using the number average molecular weight as the reference.

The added amount of the alcohol (B) indicates an added amount (mol) per 1 mol of the structure represented by —(C=O)—O—(C=O)— that the polymer (A) has.

The added amount of the monomer (I) (HEMAC) is an added amount (mol) per 1 mol of the polymer (A).

The added amount of each polymerizable acrylic acid ester indicates an added amount (g) per 100 g of the polymer (A).

The sequence I of the modification indicates the modification step of the polymer (A) carried out in the order of the modification with the monomer (I), the modification with the alcohol (B), and the modification with the monomer (II).

The sequence II of the modification indicates the modification step of the polymer (A) carried out in the order of the modification with the monomer (I) and the simultaneous modification with the alcohol (B) and the monomer (II).

The sequence III of the modification indicates the modification step of the polymer (A) carried out in the order of the modification with the monomer (I), the modification with the monomer (II), and the modification with the alcohol (B).

In Table 3 below, evaluation of the physical properties of the resin solution (resin composition), the viscosity change ratio, and the solution stability according to Example and Comparative Example are listed.

TABLE 3

| | Number average molecular weight of modified polyolefin resin (C) | —(C=O)—O—(C=O)— Residual ratio | Viscosity change ratio (%) | Solution stability after 6 months |
|---|---|---|---|---|
| Example 1 | 80000 | 60 | 40 | A |
| Example 2 | 120000 | 50 | 60 | A |
| Example 3 | 30000 | 80 | 20 | B |
| Example 4 | 70000 | 50 | 50 | A |
| Comparative Example 1 | 60000 | 90 | — | C |
| Comparative Example 2 | 45000 | 40 | 90 | A |
| Comparative Example 3 | 50000 | — | 0 | A |

In Table 4 below, evaluation results for the resin solution (resin composition) obtained in each Example and Comparative Example are listed.

TABLE 4

| | Primer test | | | | |
|---|---|---|---|---|---|
| | Adhesiveness | Moisture resistance | Warm water resistance | Gasohol resistance | UV resistance |
| Example 1 | A | A | A | A | A |
| Example 2 | A | B | B | A | A |
| Example 3 | B | B | B | B | A |
| Example 4 | B | B | B | C | B |
| Comparative Example 1 | C | C | C | C | B |
| Comparative Example 2 | C | C | B | C | B |
| Comparative Example 3 | C | C | C | C | B |

According to the above-described results, it is found that the resin compositions according to Examples 1 to 4 have excellent adhesiveness to polypropylene and, at the same time, have excellent solution stability even after the solutions are stored for a long period of time.

On the other hand, it is found that the resin compositions according to Comparative Examples 1 to 3 in which the residual ratios of the structure represented by —(C=O)—O—(C=O)— are not in the range of 50% or more and 80% or less have inferior adhesiveness to polypropylene.

The invention claimed is:

1. A modified polyolefin resin composition comprising:
   a modified polyolefin resin (C), wherein the modified polyolefin resin (C) is a resin made by modifying a polymer (A) that is a polymer (a) of a polyolefin resin or a chlorinated polyolefin resin and an α,β-unsaturated carboxylic acid derivative having a structure derived from at least one carboxy group or a chlorinated product (b) thereof with a modification component comprising an alcohol (B), and
   a residual ratio of the structure derived from at least one carboxy group in the modified polyolefin resin (C) is 50% or more and 80% or less,
   wherein the modification component further comprises a monomer (I) represented by formula (1):

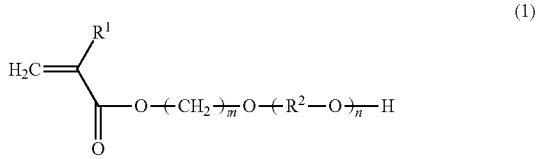

(1)

wherein $R^1$ represents a hydrogen atom or a methyl group; m represents an integer of 1 to 4; $R^2$ represents a divalent organic group; and n represents an integer of 0 to 3, and
   wherein the modified polyolefin resin (C) is modified with the monomer (I) in an amount of 2.1 mol or more and 50 mol or less relative to 1 mol of the polymer (A), and
   wherein the amount of the alcohol (B) is 2 mol or more relative to 1 mol of the structure derived from at least one carboxy group contained in the polymer (A).

2. The modified polyolefin resin composition according to claim 1,
   wherein the α,β-unsaturated carboxylic acid derivative is an α,β-unsaturated polycarboxylic acid cyclic anhydride, and
   the structure derived from at least one carboxy group is a structure represented by —(C=O)—O—(C=O)—.

3. The modified polyolefin resin composition according to claim 1,
   wherein the modification component further comprises a monomer (II) represented by formula (2):

(2)

$R^3$ represents a hydrogen atom or a methyl group; and $R^4$ represents a hydrogen atom or a group represented by —$C_nH_{2n+1}$ wherein n represents an integer of 1 to 18.

4. The modified polyolefin resin composition according to claim 1,
   wherein the polymer (A) is chlorinated.

5. The modified polyolefin resin composition according to claim 1,
   wherein the alcohol (B) is an alcohol having a carbon atom number of 1 to 10.

6. A primer comprising the modified polyolefin resin composition according to claim 1.

7. A paint comprising the modified polyolefin resin composition according to claim 1.

8. An ink comprising the modified polyolefin resin composition according to claim 1.

9. A method for producing a modified polyolefin resin composition, the method comprising:
   polymerizing a polyolefin resin or a chlorinated polyolefin resin and an α,β-unsaturated carboxylic acid derivative having a structure derived from at least one carboxy group, thereby producing a polymer (a); and
   modifying a polymer (A) that is the polymer (a) or a chlorinated product (b) thereof with a modification component comprising an alcohol (B) and a monomer (I), thereby producing a modified polyolefin resin composition comprising a modified polyolefin resin (C),
   wherein a residual ratio of the structure derived from at least one carboxy group in the modified polyolefin resin (C) is 50% or more and 80% or less,
   wherein the monomer is represented by formula (1):

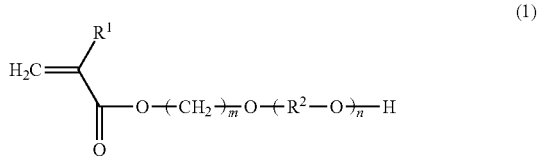

(1)

wherein $R^1$ represents a hydrogen atom or a methyl group; m represents an integer of 1 to 4; $R^2$ represents a divalent organic group; and n represents an integer of 0 to 3, and
   wherein the modified polyolefin resin (C) is modified with the monomer (I) in an amount of 2.1 mol or more and 50 mol or less relative to 1 mol of the polymer (A), and
   wherein the amount of the alcohol (B) is 2 mol or more relative to 1 mol of the structure derived from at least one carboxy group contained in the polymer (A).

10. The method according to claim 9,
    wherein the α,β-unsaturated carboxylic acid derivative is an α,β-unsaturated polycarboxylic acid cyclic anhydride; and
    the structure derived from at least one carboxy group is a structure represented by —(C=O)—O—(C=O)—.

11. The method according to claim 9,
    wherein the modification component further comprises a monomer (II) represented by formula (2):

(2)

wherein $R^3$ represents a hydrogen atom or a methyl group; and $R^4$ represents a hydrogen atom or a group represented by —$C_nH_{2n+1}$ wherein n represents an integer of 1 to 18.

* * * * *